US009300778B2

(12) United States Patent
Lee et al.

(10) Patent No.: US 9,300,778 B2
(45) Date of Patent: Mar. 29, 2016

(54) BLUETOOTH HEADSET FOR MOBILE PHONE

(75) Inventors: Chang-Su Lee, Gunpo-si (KR);
Oh-Hyuck Kwon, Suwon-si (KR);
Seung-Joo Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 880 days.

(21) Appl. No.: 13/243,500

(22) Filed: Sep. 23, 2011

(65) Prior Publication Data

US 2012/0094602 A1 Apr. 19, 2012

(30) Foreign Application Priority Data

Oct. 13, 2010 (KR) ........................ 10-2010-0099632

(51) Int. Cl.
*H04B 7/00* (2006.01)
*H04M 1/60* (2006.01)

(52) U.S. Cl.
CPC ........ *H04M 1/6066* (2013.01); *H04M 2250/02* (2013.01)

(58) Field of Classification Search
CPC ................................................ H04M 2250/02
USPC ........................................................ 455/41.2
See application file for complete search history.

(56) References Cited

U.S. PATENT DOCUMENTS

| 5,915,225 | A | * | 6/1999 | Mills | 455/558 |
| 5,933,785 | A | * | 8/1999 | Tayloe | 455/558 |
| 7,729,725 | B2 | | 6/2010 | Stenmark | |
| 2005/0009563 | A1 | | 1/2005 | Stenmark | |
| 2006/0183425 | A1 | * | 8/2006 | Seshadri et al. | 455/41.3 |
| 2007/0004457 | A1 | * | 1/2007 | Han | 455/558 |
| 2007/0072649 | A1 | | 3/2007 | Park | |
| 2009/0325650 | A1 | * | 12/2009 | Seshadri et al. | 455/569.1 |
| 2010/0311467 | A1 | * | 12/2010 | Wu | 455/558 |
| 2011/0151832 | A1 | * | 6/2011 | Lai | 455/407 |

FOREIGN PATENT DOCUMENTS

| CN | 1849835 A | 10/2006 |
| CN | 1937438 A | 3/2007 |

OTHER PUBLICATIONS

First Office Action dated Apr. 23, 2015 in connection with Chinese Patent Application No. 2011100306658.1; 21 pages.

* cited by examiner

*Primary Examiner* — David Bilodeau

(57) ABSTRACT

A Bluetooth headset for a mobile phone includes a body configured to transmit and receive a signal to and from a mobile phone via Bluetooth communication. The body is connected to at least one of a Subscriber Identification Module (SIM) card and a Universal SIM (USIM) card, and is further configured to obtain subscriber information from the one of the SIM card and the USIM card to provide the obtained subscriber information to the mobile phone.

20 Claims, 3 Drawing Sheets

BLUETOOTH HEADSET FOR MOBILE PHONE

CROSS-REFERENCE TO RELATED APPLICATION(S) AND CLAIM OF PRIORITY

The present application is related to and claims the benefit under 35 U.S.C. §119(a) of a Korean patent application filed in the Korean Intellectual Property Office on "Oct. 13, 2010" and assigned Serial No. "10-2010-0099632", the entire disclosure of which is hereby incorporated by reference.

TECHNICAL FIELD OF THE INVENTION

The present invention relates to a Bluetooth headset for a mobile phone. More particularly, the present invention relates to a Bluetooth headset that may mount a Subscriber Identification Module (SIM) card or a Universal Subscriber Identification Module (USIM) card therein.

BACKGROUND OF THE INVENTION

Recently, with development of a Bluetooth-related technology, a wireless hands-free apparatus that replaces the conventional wired hands-free apparatus is proposed in various forms. As an example of the wireless hands-free apparatus, a Bluetooth hands-free headset exists. The Bluetooth headset may be connected with a mobile phone and used for communication or listening to music. The Bluetooth headset is easy for a user to be active while wearing it, so that the Bluetooth headset is widely used.

Currently, with development of an electronics communication industry, a mobile phone has become a necessity of a modern society, and plays a role as important means for transferring information changing fast. Under this circumstance, a mobile phone has additional functions, but has an overload in meeting a user's need. The Bluetooth headset related to the mobile phone also has an overload. The conventional Bluetooth headset was a simple wireless device for performing only an earphone function and a microphone function for communication. A different approach for the Bluetooth headset is required in the circumstance where a mobile phone improves its function more and more.

SUMMARY OF THE INVENTION

To address the above-discussed deficiencies of the prior art, it is a primary object to provide at least the advantages described below. Accordingly, an aspect of the present disclosure is to provide a Bluetooth headset for a mobile phone that can mount a Subscriber Identification Module (SIM) card or a Universal Subscriber Identification Module (USIM) card therein and detect subscriber information from the mounted SIM card or USIM card.

Another aspect of the present disclosure is to provide a Bluetooth headset for a mobile phone that detects a SIM card or a USIM card and provides subscriber information to a counterpart mobile phone that communicates via Bluetooth.

Other aspects, advantages and salient features of the invention will become apparent to those skilled in the art from the following detailed description, which, taken in conjunction with the annexed drawings, discloses embodiments of the invention.

According to an embodiment, a bluetooth headset for a mobile phone is provided. The Bluetooth headset for a mobile phone includes a body for transmitting/receiving a signal to/from the related mobile phone via Bluetooth communication. The body mounts at least one Subscriber Identification Module (SIM) card or Universal SIM (USIM) card therein, and obtains subscriber information from the mounted SIM card or USIM card to provide the obtained subscriber information to the related mobile phone.

According to another embodiment, a mobile phone for performing mobile communication after identifying subscriber information is provided. The mobile phone includes a mobile communication module for performing the mobile communication, a Bluetooth module for performing Bluetooth communication, and a controller for obtaining subscriber information from a counterpart external device that performs Bluetooth communication via the Bluetooth module, and performing the mobile communication via the mobile communication module using the subscriber information obtained from the external device.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features and advantages of certain embodiments of the present invention will be more apparent from the following description taken in conjunction with the accompanying drawings in which.

Throughout the drawings, like reference numerals will be understood to refer to like parts, components and structures.

DETAILED DESCRIPTION OF THE INVENTION

Figure 1:
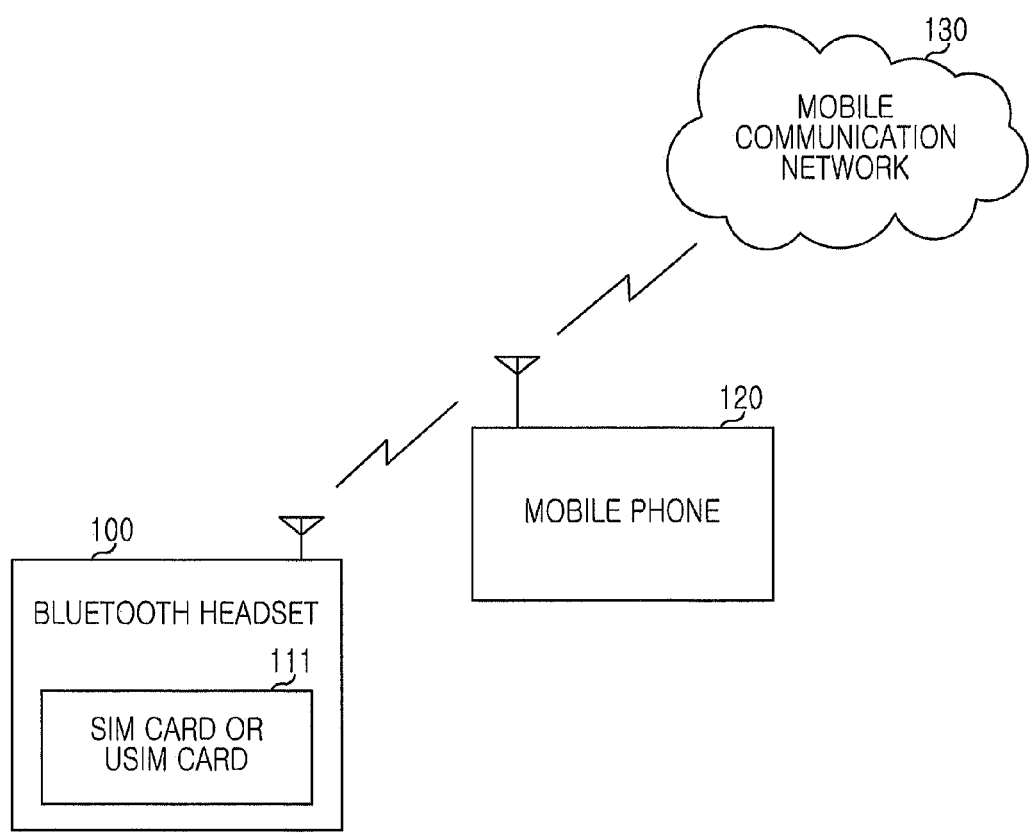
FIG. 1 illustrates a relation between a Bluetooth headset for a mobile phone and a mobile phone according to the present disclosure.
Figure 2:
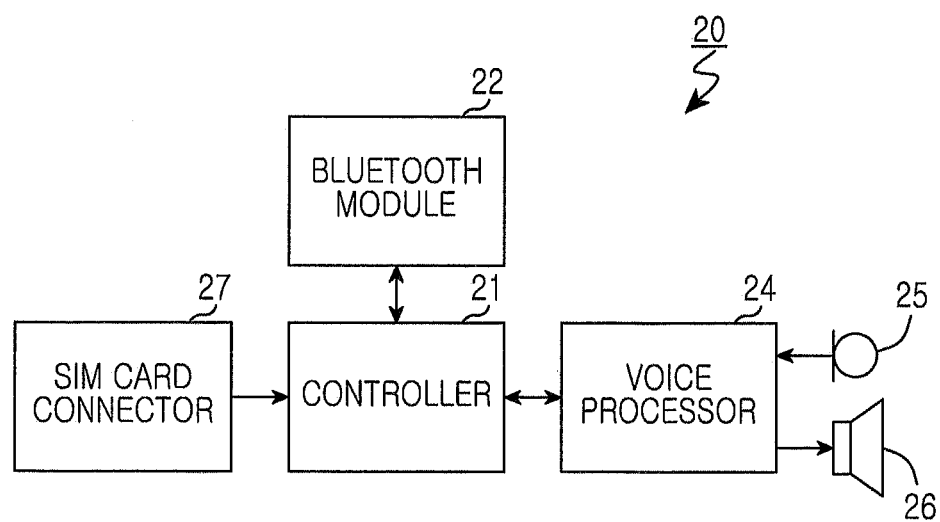
FIG. 2 is a block diagram of a Bluetooth headset according to the present disclosure.
Figure 3:
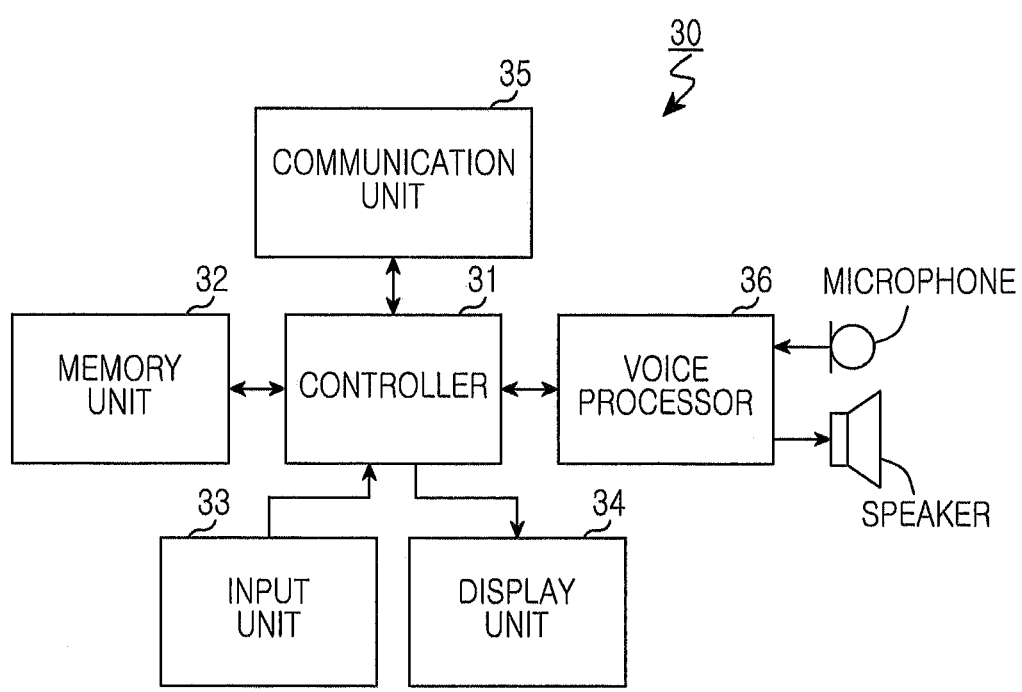
FIG. 3 is a block diagram of a mobile phone related to a Bluetooth headset according to the present disclosure.

FIGS. 1 through 3, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in a wireless communication system. The following description with reference to the accompanying drawings is provided to assist in a comprehensive understanding of embodiments of the invention as defined by the claims and their equivalents. It includes various specific details to assist in that understanding but these are to be regarded as merely examples. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of embodiments of the present invention is provided for illustrative purposes only and not for limiting the invention as defined by the appended claims and their equivalents.

Embodiments of the present disclosure provide a Bluetooth headset for a mobile phone. More particularly, embodiments of the present disclosure provide a Bluetooth headset that can mount a Subscriber Identification Module (SIM) card or a Universal Subscriber Identification Module (USIM) card therein to detect subscriber information from the SIM card or the USIM card and provide the subscriber information requested by a counterpart mobile phone that communicates via Bluetooth.

FIG. 1 illustrates a relation between a Bluetooth headset for a mobile phone and a mobile phone according to the present disclosure.

Referring to FIG. 1, the mobile phone 120 transmits/receives a signal by mobile-communicating with a mobile communication network 130. The mobile communication denotes a mobile communication scheme such as a Global System for Mobile communications (GSM). In addition, the Bluetooth headset 100 and the mobile phone 120 transmit/receive a signal via Bluetooth communication. The mobile phone 120 receives a voice signal from the mobile communication network 130 and transmits the received voice signal to the Bluetooth headset 100. The Bluetooth headset 100 outputs the voice signal received from the mobile phone 120 via a speaker. In addition, the Bluetooth headset 100 transmits a voice signal input via a microphone to the mobile phone 120. The mobile phone 120 receives the voice signal from the Bluetooth headset 100 to transmit the same to the mobile communication network 130.

The mobile phone 120 may require subscriber information for performing mobile communication. The mobile phone 120 should obtain authentication of the subscriber information from the mobile communication network 130. For this purpose, the Bluetooth headset 100 according to the present disclosure mounts a SIM card or a USIM card 111. The SIM card or the USIM card 111 denotes a small card that realizes a subscriber identification module, and includes subscriber information therein. The Bluetooth headset 100 may obtain mounted subscriber information from the SIM card or the USIM card to provide the subscriber information to the related mobile phone 120. Therefore, the Bluetooth headset 100 may change a user of mobile communication that uses the mobile phone 120 by changing the SIM card or the USIM card that mounts the subscriber information.

The Bluetooth headset 100 according to the present disclosure may mount and detect at least one SIM card or USIM card. The mobile phone 120 related to the Bluetooth headset 100 may obtain the subscriber information and then select one of the subscriber information. In addition, in an example where the related mobile phone 120 uses at least two user's information, that is, the related mobile phone 120 is given at least two phone numbers from the mobile communication network, the mobile phone 120 may obtain subscriber information from at least two SIM cards or USIM cards mounted in the Bluetooth headset 100.

Therefore, when the mobile phone 120 cannot mount and detect a SIM card or a USIM card, the Bluetooth headset 100 according to the present disclosure may be used. For example, where a SIM card or a USIM card cannot be used due to destruction of the mobile phone 120, the Bluetooth headset 100 may be easily used. Furthermore, a mobile phone that may perform Bluetooth communication but cannot mount a SIM card or a USIM card may be related to an aspect of the present disclosure by performing software upgrade. In addition, even though the mobile phone 120 may mount and detect a separate SIM card or a USIM card, when the mobile phone 120 uses the related Bluetooth headset 100, an advantage as a wireless device is achieved and an ability in obtaining and selecting subscriber information is increased.

The Bluetooth headset 100 according to the present disclosure includes a body for transmitting/receiving a signal via the Bluetooth communication. The body has a connector for mounting a SIM card or a USIM card therein, and as described above, may obtain subscriber information from the mounted SIM card or USIM card to transmit the subscriber information to the related mobile phone. The connector may have a shape that can be easily detached at the outside such as a slot into which the SIM card or the USIM card may be inserted.

The Bluetooth headset according to the present disclosure may cooperate with a dual SIM mobile phone or a dual standby mobile phone. The dual SIM mobile phone may mount two SIM cards therein, and obtain subscriber information from one selected from the two SIM cards. That is, the dual SIM mobile phone may have two registered phone numbers for communication, but may select and use one of them. In addition, the dual standby mobile phone may mount two SIM cards therein and obtain and use subscriber information from both the two SIM cards. That is, the dual standby mobile phone may receive a call via one phone number during communication via the other phone number.

The dual SIM mobile phone and the dual standby mobile phone may receive and use subscriber information via the Bluetooth headset and Bluetooth communication according to the present disclosure. A user may select and use one of subscriber information of not only a SIM card mounted in a dual SIM mobile phone but also a SIM card mounted in the Bluetooth headset in the dual SIM mobile phone. In addition, a user may select and use two of subscriber information of not only a SIM card mounted in a dual standby mobile phone but also a SIM card mounted in the Bluetooth headset in the dual standby mobile phone.

Furthermore, the Bluetooth headset according to the present disclosure may provide only subscriber information to the related mobile phone. That is, the mobile phone may receive only subscriber information from the Bluetooth headset and then communicate using a speaker and a microphone provided to the mobile phone. An aspect of the present disclosure may be applied to a wireless device that can transmit information, particularly, subscriber information used for mobile communication to the related mobile phone via the Bluetooth communication. Furthermore, an aspect of the present disclosure may be applied to a mobile phone that may obtain subscriber information from the outside via the Bluetooth communication and use the obtained subscriber information. For this purpose, the wireless device and the mobile phone are equipped with a relevant software circuit.

FIG. 2 is a block diagram of a Bluetooth headset according to the present disclosure.

Referring to FIG. 2, the Bluetooth headset 20 includes a controller 21 for performing an overall control, a Bluetooth module 22 for performing Bluetooth communication, a voice processor 24 for modulating/demodulating a voice signal, a microphone 25 for receiving a voice signal, a speaker 26 for outputting a voice signal, and a SIM card connector 27 for connecting a SIM card. The controller 21 transmits/receives a signal to/from a related mobile phone via the Bluetooth module 22. The voice processor 24 modulates a voice signal input from the microphone 25 and converts the voice signal into voice data under control of the controller 21. In addition, the voice processor 24 demodulates voice data provided from the Bluetooth module 22 as a voice signal and outputs the voice signal as a voice via the speaker 26 under control of the controller 21. For example, the related mobile phone receives a voice signal via mobile communication and transmits the received voice signal to the Bluetooth headset 20 via the Bluetooth communication. The controller 21 processes to receive a voice signal from the related mobile phone via the Bluetooth module 22 and output the received voice signal to the speaker 26. In addition, the controller 21 processes to receive a voice signal from the microphone 25 and transmit the received voice signal to the related mobile phone via the Bluetooth module 22. The related mobile phone transmits a voice signal received from the Bluetooth headset 20 to a mobile communication network.

Furthermore, the controller 21 detects a SIM card or a USIM card mounted in the SIM card connector 27 to obtain subscriber information. In addition, in the example where a counterpart mobile phone requests subscriber information, the controller 21 may process to transmit the subscriber information. As described above, the Bluetooth headset 20 according to the present disclosure may provide only subscriber information to the related mobile phone. Furthermore, though not shown, the Bluetooth headset 20 may further include a key input unit and a display unit. Furthermore, the Bluetooth headset 20 may further include storage for storing data used for performing an operation of the controller 21, or storing temporary data occurring during an operation of the controller 21.

FIG. 3 is a block diagram of a mobile phone related to a Bluetooth headset according to the present disclosure.

Referring to FIG. 3, the mobile phone 30 may include a controller 31 for controlling an overall operation, a memory unit 32 for storing data, an input unit 33 for receiving a signal, a display unit 34 for outputting data, a communication unit 35 for wireless communication, and a voice processor 36 for modulating/demodulating a voice signal. The mobile phone 30 is authenticated using subscriber information, and then performs mobile communication such as GSM. Description of known elements is omitted.

According to the present disclosure, the controller 31 processes to use subscriber information obtained via the communication unit 35. The controller 31 processes to output subscriber information obtained via the communication unit 35 in the form a list on the display unit 34 so that a user may select the subscriber information. When one subscriber information is selected from the subscriber information list output on the display unit 34, mobile communication using a registered phone number is possible.

More particularly, the communication unit 35 may perform mobile communication and Bluetooth communication. The communication unit 35 receives subscriber information from a Bluetooth headset according to the present disclosure, and provides the subscriber information to the controller 31. The controller 31 is authenticated by a mobile communication network via the communication unit 35 using the subscriber information provided by the controller 31, and then performs mobile communication.

Consequently, the Bluetooth headset according to the present disclosure may detect a SIM card or a USIM card to obtain subscriber information, and provide the subscriber information to a mobile phone where mobile communication is authenticated using subscriber information via the Bluetooth communication.

Although the invention has been shown and described with reference to certain embodiments thereof, it will be understood by those skilled in the art that various changes in form and details may be made therein without departing from the spirit and scope of the invention as defined by the appended claims and their equivalents. Therefore, the scope of the present invention should not be limited to the above-described embodiments but should be determined by not only the appended claims but also the equivalents thereof.

What is claimed is:

1. A Bluetooth headset for a mobile phone, the Bluetooth headset comprising:
   a body physically connected to one of a Subscriber Identification Module (SIM) card and a Universal SIM (USIM) card, the body configured to transmit and receive control signals for establishing and at least temporarily maintaining a Bluetooth connection with the mobile phone, obtain subscriber information from the one of the SIM card and the USIM card, and provide the subscriber information obtained to the mobile phone via Bluetooth communication,
   wherein the Bluetooth headset provides only the subscriber information to the mobile phone and does not transmit and receive any other signal, other than the control signals, to or from the mobile phone.

2. The headset of claim 1, wherein the one of the SIM card and the USIM card is detachable.

3. The headset of claim 1, wherein the mobile phone identifies a mobile communication subscriber using the subscriber information.

4. The headset of claim 1, wherein the mobile phone includes at least one of a SIM card and a USIM card and selectively uses subscriber information provided from one of (i) the SIM card or the USIM card in the mobile phone or (ii) the SIM card or the USIM card in the body.

5. The headset of claim 1, wherein the mobile phone selects and uses subscriber information provided from the Bluetooth headset.

6. The headset of claim 1, wherein the one of the SIM card and the USIM card include subscriber information for more than one telephone number.

7. The headset of claim 1, wherein the mobile phone selects and uses subscriber information from more than one telephone number.

8. A system for performing mobile communication using subscriber information, the system comprising:
   a mobile phone comprising:
      a mobile communication module configured to perform the mobile communication;
      a Bluetooth module configured to receive subscriber information from an external device via Bluetooth communication; and
      a controller configured to obtain subscriber information from one of a Subscriber Identification Module (SIM) card or Universal SIM (USIM) card in the mobile phone, determine whether to use the received subscriber information from the external device or the obtained subscriber information from the SIM or USIM card in the mobile phone to perform the mobile communication, and perform the mobile communication via the mobile communication module using the determined subscriber information; and the external device configured to transmit and receive control signals for establishing and at least temporarily maintaining a Bluetooth connection with the mobile phone and provide the subscriber information to the mobile phone, wherein the external device provides only the subscriber information to the mobile phone and does not transmit or receive any other signal, other than the control signals, to and from the mobile phone.

9. The system of claim 8, wherein:

the external device comprises a body configured to transmit and receive the control signals to and from the mobile phone via Bluetooth communication, the body is connected to one of a SIM card and a USIM card, and the external device is configured to obtain the subscriber information to send to the Bluetooth module in the mobile phone from one of the SIM card and the USIM card connected to the body to provide the obtained subscribed information to the mobile phone.

10. The system of claim 8, wherein the controller is further configured to determine which subscriber information to use to perform the mobile communication based on a user selection of one of the subscriber information received from the external device or the subscriber information obtained from the SIM or USIM card in the mobile phone.

11. The system of claim 8, wherein the one of the SIM card and the USIM card is detachable.

12. The system of claim 8, wherein the controller is further configured to identify a mobile communication subscriber using the determined subscriber information.

13. The system of claim 8, wherein the controller is further configured to obtain subscriber information for more than one telephone number, and select and use subscriber information for one of the more than one telephone number.

14. A method for performing mobile communication using subscriber information, the method comprising:

transmitting and receiving, using a Bluetooth headset, control signals for establishing and at least temporarily maintaining a Bluetooth connection with a mobile phone;

providing, using the Bluetooth headset, subscriber information to the mobile phone using Bluetooth communication, wherein the Bluetooth headset provides only the subscriber information to the mobile phone and does not transmit or receive any other signal, other than the control signals, to and from the mobile phone;

obtaining subscriber information from one of a Subscriber Identification Module (SIM) card or Universal SIM (USIM) card in the mobile phone;

determining whether to use the subscriber information received from the Bluetooth headset or the subscriber information obtained from the SIM or USIM card in the mobile phone to perform the mobile communication; and performing the mobile communication using the determined subscriber information.

15. The method of claim 14, wherein the Bluetooth headset comprises a body for transmitting and receiving the control signals to and from the mobile phone via the Bluetooth communication, and wherein the body is connected to one of a SIM card and a USIM card, and obtains the subscriber information to send to the mobile phone from one of the SIM card and the USIM card connected to the body to provide the obtained subscribed information to the mobile phone.

16. The method of claim 14, wherein determining whether to use the subscriber information received from the Bluetooth headset or the subscriber information obtained from the SIM or USIM card in the mobile phone to perform the mobile communication comprises determining which subscriber information to use to perform the mobile communication based on a user selection of one of the subscriber information received from the external device or the subscriber information obtained from the SIM or USIM card in the mobile phone.

17. The method of claim 14 further comprising:

identifying a mobile communication subscriber using the determined subscriber information.

18. The method of claim 14 further comprising:

obtaining subscriber information for more than one telephone numbers; and selecting and using subscriber information for one of the more than one telephone numbers.

19. The system of claim 8, wherein:

to perform the mobile communication, the mobile communication module is configured to place or receive a first call using the determined subscriber information, and the mobile communication module is configured to enable the dual standby by receiving a second call during the first call using the non-determined one of the received or obtained subscriber information.

20. The method of claim 14, further comprising enabling dual standby using both the received and obtained subscriber information.

* * * * *